UNITED STATES PATENT OFFICE.

CHARLES DE LA HARPE, OF BASEL, SWITZERLAND, ASSIGNOR TO DYE WORKS, FORMERLY L. DURAND, HUGUENIN & CO., OF BASEL, SWITZERLAND.

PROCESS OF CONDENSING GALLOCYANINS WITH AMINS.

No. 897,619.  Specification of Letters Patent.  Patented Sept. 1, 1908.

Application filed July 6, 1907. Serial No. 382,539.

*To all whom it may concern:*

Be it known that I, CHARLES DE LA HARPE, chemist, a citizen of the Swiss Republic, and resident of Basel, Switzerland, have invented new and useful Improvements in the Manufacture of Condensation Products of Gallocyanins with Amins, of which the following is a full, clear, and complete specification.

It is known that gallocyanins can be condensed with amins and that during the process only half the gallocyanin that is used is condensed, while the other half is reduced by the eliminated hydrogen. The yield of amino-compound is therefore only half what it might be. When it is attempted to avoid this objection by adding an oxidizing agent to the mixture, the desired result is not attained because the oxidizing agent is consumed in oxidizing the amin.

The present invention relates to a method whereby the reduction of the gallocyanin can be minimized or prevented and consists in conducting the condensation in presence of an aromatic nitrohydrocarbon.

The proportion of the nitro-compound that is used may be varied within wide limits.

Example I. 50 kilos of the gallocyanin made from nitrosodimethylanilin and gallic acid, are introduced into a mixture of 30 kilos of anilin and 120 kilos of nitrobenzene; the mixture is heated at 100° C. for 4 hours, while stirring well; 100 kilos of nitrobenzene are now added, the mixture is filtered and the solid product washed with alcohol and dried. The latter has the known properties, dissolving in concentrated sulfuric acid to a violet solution which when heated yields the dyestuff known in the trade as delphin blue.

Example II. 50 kilos of the gallocyanin made from nitrosodiethylanilin and gallamic acid are introduced into a mixture of 130 kilos of para-toluidin and 20 kilos of dinitrobenzene, and the whole is heated at 100° C. for 4 hours while stirring well; 100 kilos of alcohol are now added, the mass is allowed to cool and filtered and the solid product is washed with alcohol and dried.

Example III. 50 kilos of the gallocyanin made from nitrosodimethylanilin and gallamic acid are introduced into a mixture of 150 kilos of anilin and 10 kilos of crude trinitronaphthalene made by heating mono-nitronaphthalene with a mixture of nitric acid and sulfuric acid. The whole is heated at 110° C. for 4 hours, while stirring well; 100 kilos of alcohol are then added, the mixture is filtered and the solid product washed with alcohol and dried.

In the foregoing examples, other gallocyanins and amins may be substituted for those named.

What I claim is:

1. The process of making amino-compounds, which consists in condensing a gallocyanin with an amin in the presence of an aromatic nitrohydrocarbon.

2. The process of making amino-compounds, which consists in condensing a gallocyanin with an amin in the presence of dinitrobenzene.

In witness whereof I have hereunto signed my name this 25 day of June 1907, in the presence of two subscribing witnesses.

CHARLES DE LA HARPE.

Witnesses:
GEO. GIFFORD,
AMAND RITTER.